(12) United States Patent
Zoellner

(10) Patent No.: US 9,457,646 B2
(45) Date of Patent: Oct. 4, 2016

(54) METHOD AND CONTROL UNIT FOR OPERATING A DRIVE TRAIN

(71) Applicant: ZF Friedrichshafen AG, Friedrichshafen (DE)

(72) Inventor: Tobias Zoellner, Lindau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/873,478

(22) Filed: Oct. 2, 2015

(65) Prior Publication Data

US 2016/0096520 A1    Apr. 7, 2016

(30) Foreign Application Priority Data

Oct. 2, 2014   (DE) .................. 10 2014 220 066

(51) Int. Cl.
*B60W 20/10*    (2016.01)
*B60K 6/20*    (2007.10)
(Continued)

(52) U.S. Cl.
CPC ............. *B60K 6/20* (2013.01); *B60K 6/387* (2013.01); *B60K 6/547* (2013.01); *B60W 10/06* (2013.01); *B60W 10/08* (2013.01); *B60W 10/115* (2013.01); *B60W 20/10* (2013.01); *B60W 20/102* (2013.01); *B60W 20/30* (2013.01); *B60W 30/19* (2013.01); *F16H 3/728* (2013.01); *B60K 2006/4816* (2013.01); *B60W 2540/10* (2013.01); *B60W 2710/0666* (2013.01);
(Continued)

(58) Field of Classification Search
None
See application file for complete search history.

(56) References Cited

U.S. PATENT DOCUMENTS 8,249,768 B2    8/2012 Mori et al.
8,257,223 B2    9/2012 Kaltenbach et al.
(Continued)

FOREIGN PATENT DOCUMENTS

AT         9756 U1       3/2008
DE    102007038772 A1    2/2009
(Continued)

OTHER PUBLICATIONS

German Patent Office Search Report, Jun. 29, 2015.

*Primary Examiner* — Justin Holmes
(74) *Attorney, Agent, or Firm* — Dority & Manning, P.A.

(57) ABSTRACT

A method is provided for operating a drive train having drive units, one transmission, and one output. A first drive unit acts on a first transmission shaft of the transmission, and a second drive unit acts on a second transmission shaft. The transmission comprises several shift elements, whereas, at the output, an output torque that depends on the torque required by the driver is provided. For the opening of a shift element, the shift element is positioned in a load-free manner. For the load-free positioning of the shift element, target torques are calculated for the first and the second drive unit, by means of which, while maintaining the torque required by the driver at the output, the shift element is positioned in a load-free manner. There is an examination of whether at least one of such target torques violates the torque limit of the respective drive unit. If it is then determined that neither of the target torques violates a torque limit, the first and second drive units are guided in a controlled manner to the respective target torque while maintaining the torque required by the driver at the output. If it is then determined that at least one of the target torques violates a torque limit of the respective drive unit, the shift element is positioned in a load-free manner while providing an output torque that deviates from the torque required by the driver.

8 Claims, 4 Drawing Sheets

(51) Int. Cl.
  *B60W 20/00* (2016.01)
  *B60W 10/06* (2006.01)
  *B60W 10/08* (2006.01)
  *B60K 6/387* (2007.10)
  *B60K 6/547* (2007.10)
  *B60W 10/115* (2012.01)
  *B60W 30/19* (2012.01)
  *F16H 3/72* (2006.01)
  *B60K 6/48* (2007.10)

(52) U.S. Cl.
  CPC .............. *B60W 2710/083* (2013.01); *F16H 2200/2064* (2013.01); *Y10S 903/93* (2013.01)

(56) References Cited

U.S. PATENT DOCUMENTS 8,684,875 B2   4/2014   Kaltenbach et al.

| | | |
|---|---|---|
| 2014/0150604 A1 | 6/2014 | Kaltenbach |
| 2015/0057863 A1* | 2/2015 | Kuwamoto ........... B60W 20/40 701/22 |
| 2015/0073635 A1* | 3/2015 | Takahashi .............. B60K 6/445 701/22 |
| 2015/0142232 A1* | 5/2015 | Tabata ................... B60K 6/445 701/22 |
| 2016/0052381 A1 | 2/2016 | Kaltenbach et al. |

FOREIGN PATENT DOCUMENTS

| | | |
|---|---|---|
| DE | 102010063582 A1 | 6/2012 |
| DE | 102011080069 A1 | 1/2013 |
| DE | 102012007622 A1 | 10/2013 |
| DE | 102012220828 A1 | 5/2014 |
| DE | 102013002330 A1 | 8/2014 |
| WO | WO 2013/156195 A1 | 10/2013 |

\* cited by examiner

METHOD AND CONTROL UNIT FOR OPERATING A DRIVE TRAIN

FIELD OF THE INVENTION

The invention relates to a method and a control unit for operating a drive train.

BACKGROUND OF THE INVENTION

Drive trains of hybrid vehicles comprise several drive units, that is, a first drive unit formed as an internal combustion engine and a second drive unit formed as an electric motor, a transmission, and an output. With such a drive train of a hybrid vehicle, the first drive unit acts on a first transmission shaft of the transmission, whereas the second drive unit acts on a second, different transmission shaft of the transmission. The transmission of the drive unit comprises several shift elements, which are typically designed as frictional-locking shift elements, such as (for example) clutches or brakes. At the output of the drive train, an output torque that depends on the torque required by the driver is provided. In defined operating situations of such a drive train, it is necessary to open a previously locked shift element of the transmission. If a frictional-locking shift element is to be opened, this may occur in a simple manner by the frictional-locking shift element being brought into slip. This gives rise to friction torques or drag torques, which have negative effects on consumption. Therefore, in transmissions of drive trains, frictional-locking shift elements are increasingly being replaced by positive-locking shift elements, such as claw shift elements. However, so that they can be opened, such positive-locking shift elements must be transferred into a load-free state or positioned in a load-free manner. However, with drive trains known from practice, this is possible only to an insufficient degree.

DE 10 2012 007 622 A1 discloses a method for carrying out a shifting in a transmission of a drive train, with which a first drive unit formed as an internal combustion engine drives a generator, which is coupled through a power electronics unit to an engine transmission unit. The engine transmission unit comprises a second drive unit formed as an electric motor and a transmission, whereas the transmission is designed as a planetary transmission.

There is a need for a method of operating a drive train with at least two drive units engaging at different transmission shafts, that is, a method by means of which one shift element of the transmission can be positioned in a load-free manner, and in a manner in which, upon the load-free positioning of the shift element to be opened, the output torque prevailing at the output deviates as little as possible from the torque required by the driver.

SUMMARY OF THE INVENTION

On this basis, the present invention is based on a task of providing a novel method and a control unit for operating a drive train. Additional objects and advantages of the invention will be set forth in part in the following description, or may be obvious from the description, or may be learned through practice of the invention.

The tasks are achieved through a method for operating a drive train as described herein. In accordance with the invention, for the load-free positioning of the shift element to be opened, target torques are calculated for the first drive unit and the second drive unit, by means of which, while maintaining the torque required by the driver at the output, the shift element to be opened can be positioned in a load-free manner, whereas there is an examination of whether at least one of such target torques violates the torque limit of the respective drive unit, whereas, if it is then determined that neither of the target torques violates a torque limit of the respective drive unit, the first and second drive unit are guided in a torque-controlled manner to the respective target torque while maintaining the torque required by the driver at the output. Whereas, if it is then determined that at least one of the target torques violates a torque limit of the respective drive unit, the shift element to be opened is positioned in a load-free manner while providing an output torque that deviates from the torque required by the driver. The invention proposes a method by means of which a shift element to be opened of a transmission can be positioned in a load-free manner, in such manner that the output torque provided at the output, depending on the torque limits of the participating drive units, either does not deviate, or deviates as little as possible, from the torque required by the driver. This allows for a particularly advantageous operation of a drive train with at least two drive units and one transmission, namely a particularly advantageous opening of a shift element to be opened of the transmission, which may comprise in particular a positive-locking shift element such as (for example) a shifting claw.

According to an additional form of the invention, if neither of the target torques violates the torque limit of the respective drive unit, the first and second drive unit are guided along torque guide curves, in particular along linear torque ramps, in a torque-controlled manner to the respective target torque while maintaining the torque desired by the driver at the output, whereas the slopes of the torque ramps for the first drive unit and the second drive unit depend on the transmission ratio relationship of the transmission of the two drive units in such a manner that, for the control of torque along the torque ramps, the output torque remains constant at a constant torque required by the driver. In such a case, the output torque provided upon the load-free positioning of the shift element to be opened at the output exactly matches the torque required by the driver.

According to a further additional form of the invention, if at least one of the target torques violates the torque limit of the respective drive unit, the first drive unit and the second drive unit are guided, initially while maintaining the torque required by the driver at the output, along the torque guide curves, in particular along linear torque ramps, in a torque-controlled manner toward the respective target torque, until one of the drive units reaches its torque limit, whereas, subsequently, the torque at that drive unit that has reached its torque limit is kept constant and the torque of the other drive unit that has not reached its torque limit is brought along a flattened torque guide curve, in particular along a linear torque ramp with a flattened slope, while providing an output torque that deviates from the torque required by the driver, in a torque-controlled manner to a target torque, at which the shift element to be opened is positioned in a load-free manner. If the other drive unit also reaches its torque limit, new target torques are calculated for both drive units, and the drive units are guided in a torque-controlled manner along the torque ramps to such target torques, at which the shift element to be opened, while providing an output torque that deviates from the torque required by the driver, is positioned in a load-free manner. In such cases, the output torque provided upon the load-free positioning of the shift element to be opened at the output is subject to a change, but this corresponds as closely as possible to the torque required by the driver.

According to a further additional form of the invention, if, during the torque-controlled guidance of the drive units toward their target torques, the torque required by the driver changes, the target torques for the drive units are recalculated in such a manner that the output torque provided at the output corresponds as closely as possible to the torque required by the driver. This additional form allows for the taking into account of a changing torque required by the driver during the load-free positioning of the shift element to be opened.

The present invention also encompasses a control unit for carrying out the method described herein.

BRIEF DESCRIPTION OF THE DRAWINGS

Preferred additional forms arise from the sub-claims and the following description. Embodiments of the invention are, without any limitation, more specifically described by means of the drawing. Thereby, the following is shown:

DETAILED DESCRIPTION

Figure 1:
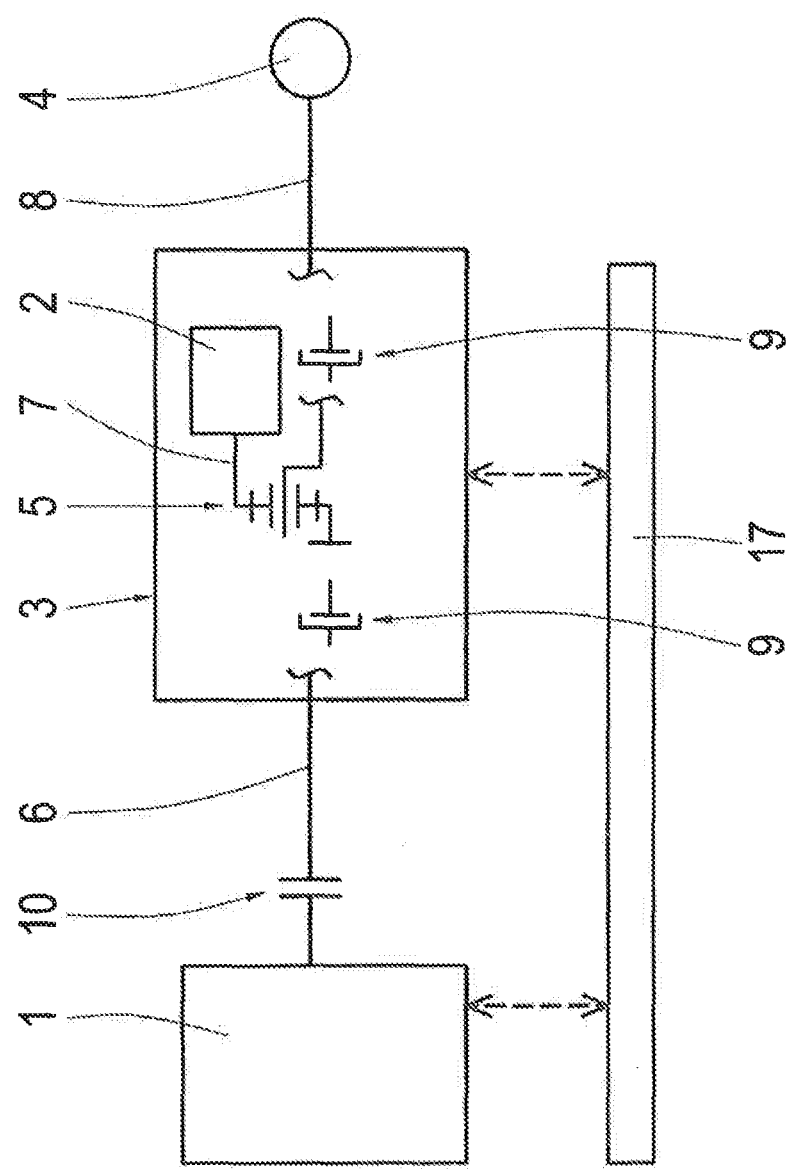
FIG. 1 a diagram of a drive train.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

The invention relates to a method and a control unit for operating a drive train.

FIG. 1 shows a diagram of a drive train of a motor vehicle, with which the method in accordance with the invention and the control unit in accordance with the invention are preferably used. The drive train of FIG. 1 comprises two drive units 1, 2, one transmission 3 and one output 4. The transmission 3 comprises at least one planetary stage 5 along with several shift elements 9.

The first drive unit 1, which is preferably an internal combustion engine, acts on a first transmission shaft 6 of the transmission 3, whereas this first transmission shaft 6 is the transmission input shaft of the transmission 3.

The second drive unit 2, which is preferably an electric motor, acts on a second transmission shaft 7 of the transmission 3, whereas this second transmission shaft 7 is a shaft internal to the transmission that, viewed in the direction of the flow of torque, is shifted between the transmission input shaft 3 and a transmission output shaft 8 of the transmission 3. In the embodiment shown, this second transmission shaft 7, on which the second drive unit 2 acts, is provided by the planetary stage 5, that is, in the embodiment shown, by the ring gear thereof.

The transmission output shaft 8 is coupled with the drive 4. In the embodiment shown, a separating clutch 10 is shifted between the first drive unit 1 and the transmission input shaft 6, through which the first drive unit 1 can be uncoupled from the transmission input shaft 6.

As already stated, in the embodiment shown, the first drive unit 1 is preferably an internal combustion engine, which provides a drive unit external to the transmission. The second drive unit 2 is preferably an electric motor, which provides a drive unit internal to the transmission. Such an electric motor can be operated as a motor or a generator.

As already stated, the transmission comprises three shift elements 9, whereas FIG. 1 shows, by way of example, two such shift elements 9, that is, one shift element 9 that is shifted between the transmission input shaft 6 and the planetary stage 5, and one additional shift element 9, which is shifted between the planetary stage 5 and the transmission output shaft 8. In each engaged gear of the transmission 3, a first number of shift elements 9 is locked and a second number of shift elements 9 is open.

To execute a gear change, at least one previously locked shift element 9 must be opened, and at least one previously opened shift element 9 must be locked. In particular, if a shift element to be opened is designed as a positive-locking shift element 9, this must be positioned in a load-free manner, such that it can be opened.

The present invention concerns a method by means of which a shift element 9 of a transmission 3 of a drive train of a motor vehicle, which comprises two drive units 1, 2 engaging at different transmission shafts 6, 7, can be positioned in a load-free manner in a particularly advantageous manner.

If, on the control side, there is a request for opening a previously locked shift element 9 of the transmission 3, for the load-free positioning of the shift element 9 to be opened by a control unit 17, which is controlled in accordance with the dashed arrows in FIG. 1 for the operation of the first drive unit 1 and the transmission 3 including the second drive unit 2, target torques are calculated for the two drive units 1, 2, by means of which, while maintaining the torque required by the driver at the output 4, the shift element 9 to be opened generally can be positioned in a load-free manner.

After calculating such target torques of the first drive unit 1 and the second drive unit 2, by means of which the shift element 9 to be opened generally can be positioned in a load-free manner while maintaining the torque required by the driver at the output 4, on a control side, there is an examination by the control unit 17 of whether at least one of such target torques violates a torque limit of the respective drive unit 1, 2.

If it is thereby determined that neither of the previously calculated target torques violates a torque limit of the respective drive unit 1, 2, the first drive unit 1 and the second drive unit 2 are guided in a torque-controlled manner by the control unit 17 to the respective target torque while maintaining the torque required by the driver at the output 4, by which the shift element 9 to be opened is positioned in a load-free manner while maintaining the torque required by the driver at the output 4.

On the other hand, if it is determined by the control unit 17 that at least one of the previously calculated target torques for the two drive units 1, 2 violates a torque limit of the respective drive unit 1, 2, the shift element 9 to be opened is positioned in a load-free manner in a torque-controlled manner while providing an output torque 4 at the output 4, which deviates from the torque required by the driver, but corresponds as closely as possible to it.

Figure 2:
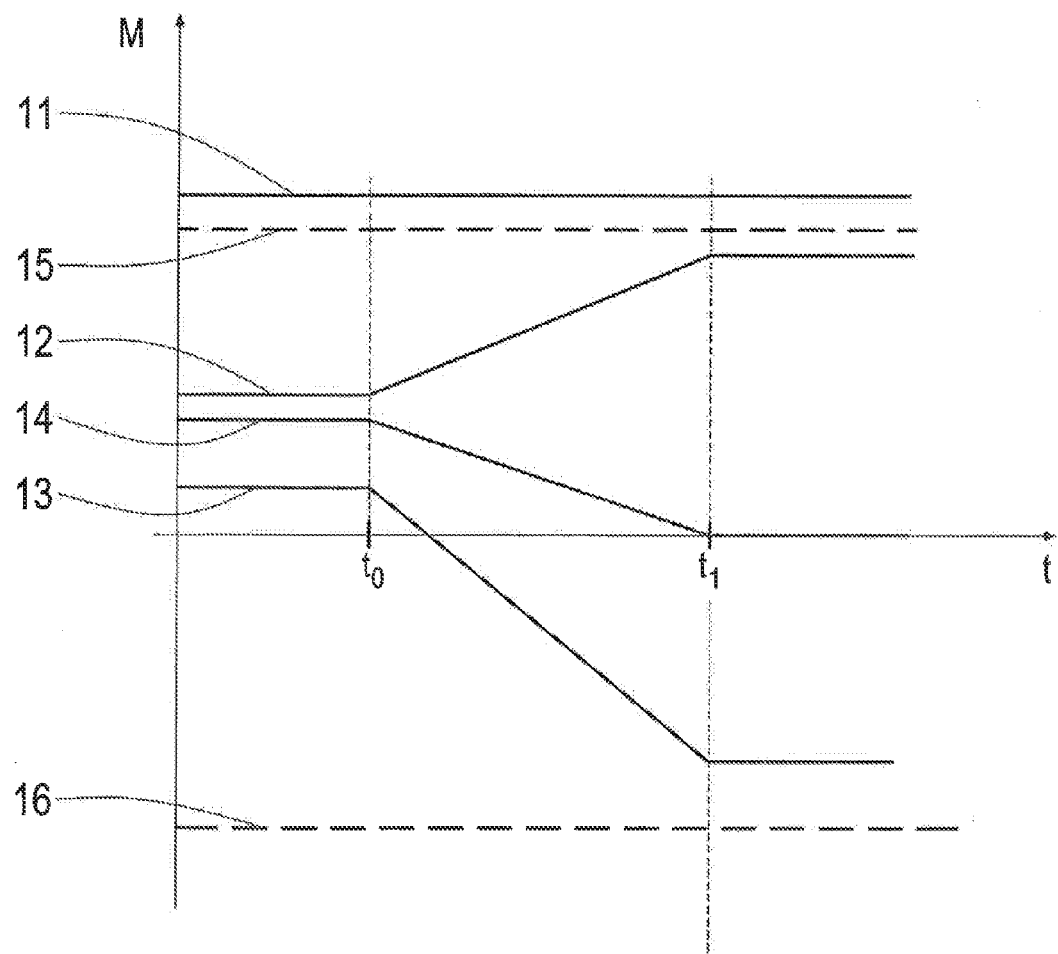
FIG. 2 a first timing diagram to clarify the method in accordance with the invention.
Figure 3:
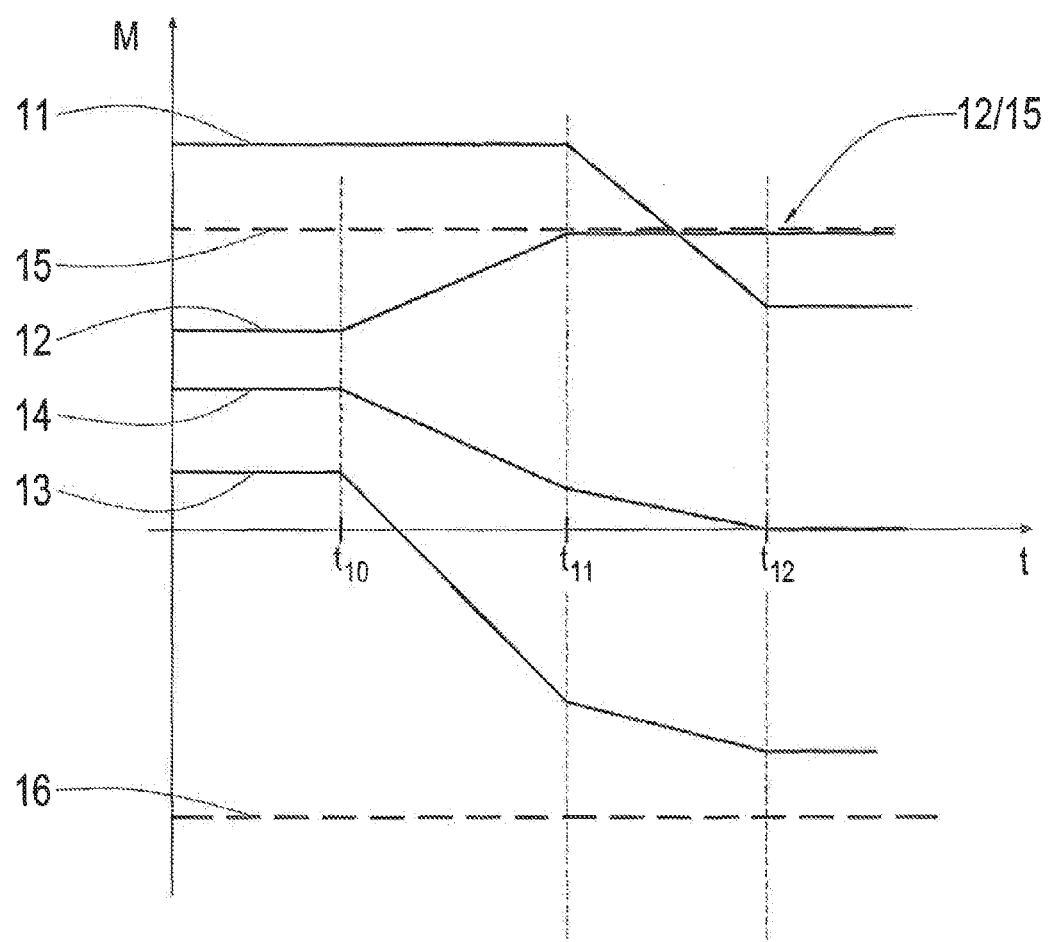
FIG. 3 a second timing diagram to clarify the method in accordance with the invention.
Figure 4:
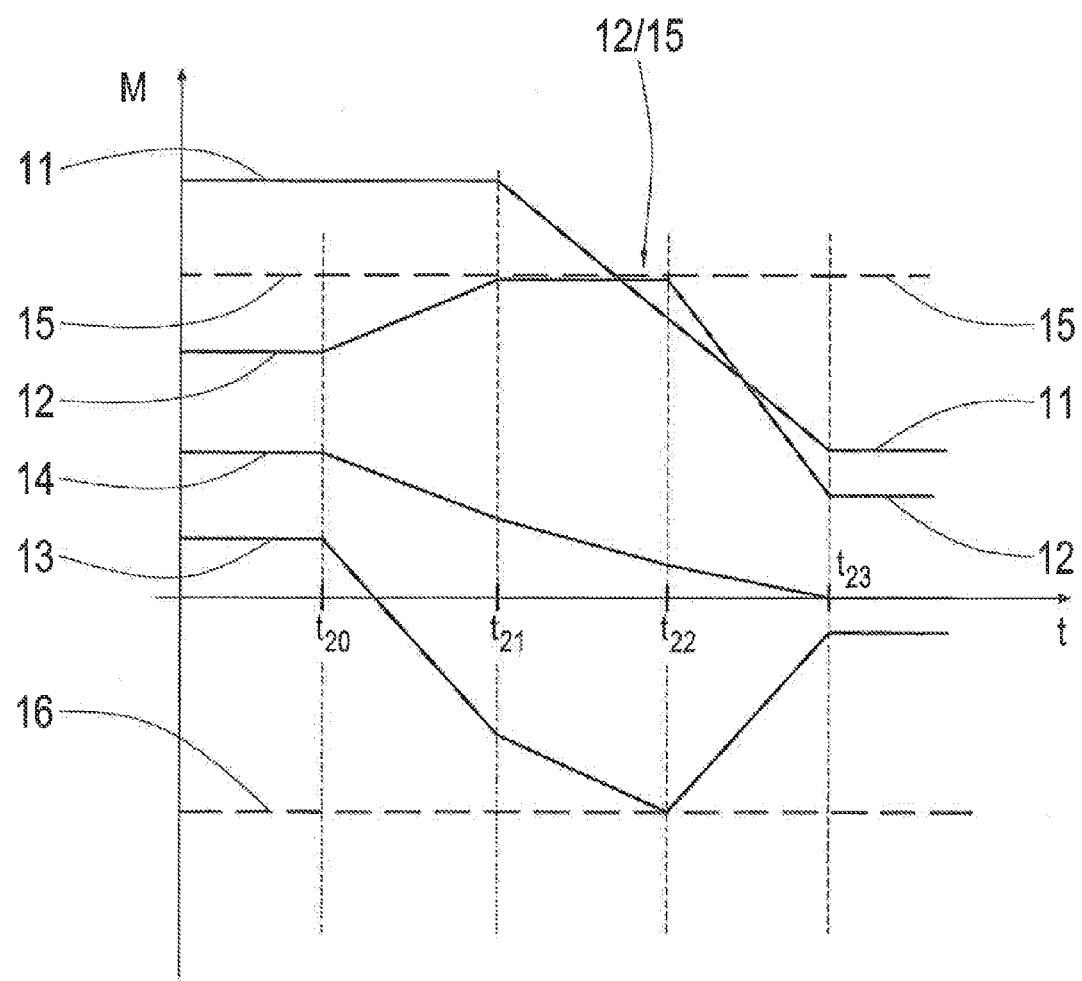
FIG. 4 a third timing diagram to clarify the method in accordance with the invention.

Further details regarding the method in accordance with the invention are described below with reference to the timing diagrams of FIGS. 2, 3 and 4, whereas FIGS. 2, 3 and 4 show several chronological torque progressions across time t. Thus, the curve progression 11 shows a chronological progression of an output torque applying at the output 4, whereas the output torque depends on a request of the driver. In FIGS. 2 to 3, it is assumed that the torque required by the driver remains constant. The curve progression 12 visualizes a chronological torque progression of the first drive unit 1. The curve progression 13 visualizes a chronological torque progression of the second drive unit 2. The curve progression 14 visualizes a chronological torque progression of the shift element 9 to be opened. The curve progressions 15 and 16 correspond to torque limits of the drive units 1, 2, that is, the curve progression 15 of an upper torque limit of the first drive unit 1 and the curve progression 16 of a lower torque limit of the second drive unit 2.

In FIG. 2, prior to the point in time to, a shift element 9 of the transmission 3 to be subsequently opened is locked, for example in a defined gear of the transmission 3, whereas the two drive units 1, 2 in accordance with the curve progressions 12 and 13 each provide a constant torque, in order to provide an output torque depending on a request of the driver in accordance with the curve progression 11 at the output 4. Thereby, the shift element 9 to be opened later in accordance with the curve progression 14 transfers a defined torque.

At the point in time t0, for example as a consequence of a gear change to be executed, the opening of the previously locked shift element 9 is requested, whereas, on the control side, target torques are then calculated for the two drive units 1 and 2 at the point in time t0, by means of which, while maintaining the torque required by the driver at the output 4, the shift element 9 to be opened can be positioned in a load-free manner.

There is then an examination of whether at least one of such target torques violates a torque limit of the respective drive unit 1, 2.

In the example of FIG. 2, it is assumed by way of example that, for the load-free positioning of the shift element 9 to be opened, the torque at the first drive unit 1 in accordance with the curve progression 12 increases to a defined target torque, and, in accordance with the curve progression 13, the torque at the second drive unit 2 must be reduced to a defined target torque, whereas, in FIG. 2, neither of such target torques violates a torque limit of the respective drive unit 1, 2. The target torque for the first drive unit 1 is, in accordance with the curve progressions 12, 15, accordingly smaller than the upper torque limit 15 of the first drive unit 1, whereas the target torque for the second drive unit 2 is, in accordance with the curve progressions 13, 16, greater than the lower torque limit 16 for the second drive unit 2. Therefore, beginning at the point in time t0, both drive units 1, 2, starting from the respective torque provided prior to the point in time t0, are guided in a torque-controlled manner to the respective target torque, which the drive units 1, 2 have reached in accordance with the curve progressions 12, 13 of FIG. 2 at the point in time t1. At the point in time t1, in accordance with the curve progression 14, the shift element 9 to be opened is then load-free, whereas, in accordance with the curve progression 11, the output torque thereby remains constant, thus maintaining the torque required by the driver at the output 4.

In accordance with FIG. 2, the torque control of the drive units 1, 2 takes place at their target torques along torque guide curves, in particular along linear torque ramps between the points in time t0 and t1. The slopes of such torque ramps are not identical. Rather, the slopes of the torque ramps for the two drive units 1, 2 depend on the transmission ratio of the transmission for the two drive units 1, 2; that is, in such a manner that, for the torque control of the drive units 1, 2 along the torque ramps, the output torque 11 at the output 4 remains constant when there is a constant torque required by the driver.

FIG. 3 shows a variant of the invention, in which one of the target torques violates the torque limit of the respective drive unit, that is, in accordance with FIG. 3, the target torque of the first drive unit 1.

In the case in which at least one of the target torques violates the torque limit of the respective drive unit 1, 2, the two drive units 1, 2, while maintaining the torque required by the driver at the output 4 and thus keeping constant the output torque 11 between the points in time t10 and t11, are initially guided toward their previously calculated target torques, that is, along torque guide curves, for example along linear torque ramps, in a torque-controlled manner and until point in time t11, at which the first drive unit 1 or the torque 11 provided by the first drive unit 1 reaches the torque limit 15. The slopes of these torque ramps are in turn not identical. Rather, the slopes of the torque ramps for the two drive units 1, 2 depend on the transmission ratio of the transmission for the two drive units 1, 2; that is, in such a manner that, for the torque control of the drive units 1, 2 along the torque ramps, the output torque 11 at the output 4 remains constant when there is a constant torque required by the driver between the points in time t10 and t11.

From the point in time t11, the torque provided by the first drive motor 1 is subsequently kept constant, and the torque of the second drive unit 2 is further reduced between the points in time t11 and t12 in accordance with the curve progression 13, along a flattened torque guide curve, in particular along a linear torque ramp with a slope that is flattened with respect to the torque ramps applicable between the points in time t10 and t11, and at an adjusted target torque by means of which, in accordance with the curve progression 14, when there is a constant torque of the first drive unit 1 at the point in time t12, the shift element 9 to be opened is positioned in a load-free manner. Thereby, in accordance with the curve progression 11, the output torque provided at the output 4 is reduced between the points in time t11 and t12; the shift element 9 to be opened is accordingly positioned in a load-free manner in such a manner that the output torque provided at the output 4 deviates from the torque required by the driver, but corresponds to it as closely as possible. In order to design the change to the output torque 11 at the output 4 to be as unnoticeable as possible for the driver, the gradient of the torque ramp, over which the torque provided by the second drive unit 2 is guided toward the target torque, is smaller between the points in time t11 and t12 than between the points in time t10 and t11.

FIG. 4 shows an arrangement of the method in accordance with the invention, with which not only one of the drive units 1, 2 violates the corresponding torque limit, but both drive units 1, 2 violate their corresponding torque limits. In turn, there is a request for opening a previously locked shifting torque 9 of the transmission 3 as of the point in time t20, whereas, for both drive units 1, those target torques that are necessary for the load-free positioning of the shift element 9 to be opened while maintaining the torque desired by driver 11 at the output 4 are in turn calculated. Beginning with the point in time t20, the torques 12, 13 provided at the drive units 1, 2 are guided along torque guide curves, in particular along linear torque ramps, in a torque-controlled manner toward the respective target torques, and until, in FIG. 4, the first drive unit 1 in turn first reaches the corresponding torque limit. The slopes of these torque ramps are in turn not identical. Rather, the slopes of the torque ramps for the two drive units 1, 2 depend on the transmission ratio of the transmission for the two drive units 1, 2; that is, in such a manner that, for the torque control of the drive units 1, 2 along the torque ramps, the output torque 11 at the output 4 remains constant when there is a constant torque required by the driver between the points in time t20 and t21. Subsequently, in accordance with FIG. 3, between the points in time t21 and t22, the torque at the first drive unit 1 is kept constant and the torque 13 at the second drive unit 2 is guided along a flattened torque guide curve, in particular along a linear torque ramp with a flattened slope, further toward an adjusted target torque, whereas the output torque 11 changes between the points in time t21 and t22. In FIG. 4, at the point in time t22, the second drive unit 2 and/or the torque 13 provided by the second drive unit 2 also reaches its corresponding torque limit 16, such that, beginning at the point in time t22, new target torques are determined for both drive units 1, 2, by means of which the shift element 9 to be opened can be positioned in a load-free manner, while providing an output torque 11 at the output 4, which does not match the torque required by the driver, but comes as closely as possible to it.

FIG. 4 shows that the torques 12, 13 provided by the drive units 1, 2 are also guided between the points in time t22 and t23 along torque guide curves, in particular along linear torque ramps, in a torque-controlled manner to the recalculated target torques, whereas, at the point in time t23, the shift element 9 to be opened is load-free.

Accordingly, in terms of the present invention, the object is to, for the load-free positioning of a previously locked shift element 9 of a transmission 3, with which two different transmission shafts 6, 7 of two different drive units 1, 2 are subjected to torques, initially determine (by way of calculation) target torques for the drive units 1, 2, which are likely to shift the shift element 9 to be opened without any load, while maintaining the torque required by the driver at the output 4. Thereby, there is an examination of whether the corresponding limit torques at the drive units 1, 2 are violated by the calculated target torques. If this is not the case, the torques provided by the drive units 1, 2 can be guided along the torque guide curves, such as linear torque ramps, in a torque-controlled manner to the target torques, whereas the shift element 9 to be opened is then positioned in a load-free manner, while maintaining the torque required by the driver at the output 4.

With the torque ramps, namely the slopes thereof, the different transmission ratio relationships for the drive units 1, 2 are taken into account.

If the target torque of at least one drive unit violates the corresponding torque limit, the shift element 9 is also positioned in a load-free manner, while providing an output torque at the output 4 that deviates as little as possible from the torque required by the driver. For this purpose, both torques of both drive units 1, 2 are initially guided along torque guide curves, such as linear torque ramps, toward their respective target torques, whereas, if a first drive unit reaches the corresponding torque limit, the torque is kept constant by such limit, but the torque at the other drive unit is further changed toward the corresponding target torque, but under a flattened torque guide curve, such as a flattened, linear torque ramp.

Although the use of linear torque ramps as torque guide curves is simple and therefore preferred, other torque guide curves, such as PT1-filtered torque guide curves or torque guide curves with S-bends, can be used.

Moreover, if the torque provided by the other drive unit reaches its corresponding torque limit, for both drive units, a new torque ratio or a new level of the target torques to be provided by them is calculated, which are likely to position the positive-locking shift element 9 to be opened in a load-free manner, while providing an output torque at the output 4 that deviates from the torque required by the driver.

In FIGS. 2 to 4, by way of example, the torque of the first drive unit 1 is increased, and the torque of the second drive unit 2 is reduced, if such torques are guided to their target torques in a torque-controlled manner. In contrast to this, it is also possible that the torque at the first drive unit 1 is reduced, and the torque at the second drive unit 2 is increased.

In FIGS. 3 and 4, if at least one drive unit with respect to the target torque reaches or violates a torque limit, the output torque at the output 4 is reduced. However, in contrast to this, it is also possible that, upon the load-free positioning of the shift element 9 to be opened, the output torque at the output 4 is then increased.

As stated above, it has been assumed in the embodiments of FIGS. 2 and 4 that the torque required by the driver is constant. However, in contrast to this, the torque required by the driver can change upon the load-free positioning or during the load-free positioning of the shift element 9 to be opened. In this case, the target torques for the drive units 1 and 2 are then adjusted accordingly, depending on the new torque required by the driver, in turn taking into account the torque limits for the drive units 1, 2, and with the aim that the shift element 9 to be opened is positioned in a load-free manner in such a manner that the output torque provided at the output 4 matches the torque required by the driver or comes as closely as possible to it.

The invention allows for a particularly advantageous opening of a positive-locking shift element 9 of a transmission 3, whereas, however, the invention can also be used for controlling frictional-locking shift elements.

The invention further relates to a control unit 17 for carrying out the method. The control unit 17 comprises means for carrying out the method, whereas such means comprise hardware-based means and software-based means. The hardware-based means comprise interfaces for exchanging data with the modules involved in the implementation of the method in accordance with the invention. Furthermore, the hardware-based means comprise a processor for data processing and a memory for data storage.

The software-based means comprise program modules for carrying out the method in accordance with the invention.

In the embodiment shown, the control unit 17 comprises a hybrid control unit, which serves the purpose of controlling both the internal combustion engine 1 and the transmission 3 including the electric motor 2. In contrast to this, the control unit 17 may also comprise a transmission control unit, which then directly exchanges data with the transmission 3 and the electric motor 2 through interfaces, and which exchanges data with a motor control unit, which serves the purpose of controlling and/or governing the operation of the internal combustion engine 1, for indirectly influencing the internal combustion engine 1.

Modifications and variations can be made to the embodiments illustrated or described herein without departing from the scope and spirit of the invention as set forth in the appended claims.

REFERENCE SIGNS

1 First drive unit
2 Second drive unit
3 Transmission

4 Output
5 Planetary stage
6 First transmission shaft/transmission input shaft
7 Second transmission shaft
8 Transmission output shaft
9 Shift element
10 Separating clutch
11 Output torque progression
12 Torque progression of the first drive unit
13 Torque progression of the second drive unit
14 Torque progression of the shift element to be opened
15 Upper torque limit of a first drive unit
16 Lower torque limit of a second drive unit
17 Control unit

The invention claimed is:

1. A method for operating a drive train having a first drive unit (1), a second drive unit (2), a transmission (3), and an output (4), whereas the first drive unit (1) acts on a first transmission shaft (6) of the transmission (3) and the second drive unit (2) acts on a second transmission shaft (7) of the transmission (3), the transmission further comprising several shift elements (9) whereby an output torque that depends on the torque required by the driver is provided at the output (4), the method comprising:

for opening of one of the shift elements (9), the shift element (9) to be opened is positioned in a load-free manner by:
calculating a target torque for each of the first drive unit (1) and the second drive unit (2) such that, with the target torques, the torque required by the driver at the output is provided and the shift element (9) to be opened is positionable in a load-free manner;
examining whether at least one of the target torques violates a torque limit of the respective drive unit;
when it is determined that neither of the target torques violates the torque limit of the respective drive unit (1, 2), the first and second drive units (1, 2) are guided in a controlled manner to their respective target torque while maintaining the torque required by the driver at the output (4); and
when it is determined that at least one of the target torques violates the torque limit of the respective drive unit (1, 2), the shift element (9) to be opened is positioned in a load-free manner while providing an output torque at the output (4) that deviates from the torque required by the driver.

2. The method according to claim 1, wherein when neither of the target torques violates the torque limit of the respective drive unit (1, 2), the first and second drive unit (1, 2) are guided along torque guide curves in a controlled manner to the respective target torque while maintaining the torque desired by driver at the output (4), wherein the torque guide curves comprise torque ramps for the first and second drive unit (1, 2) with slopes that depend on a transmission ratio relationship of the transmission (3) of the two drive units (1, 2) in such a manner that, for the control of torque along the torque ramps, the output torque remains constant at a constant torque required by the driver.

3. The method according to claim 1, wherein when at least one of the target torques violates the torque limit of the respective drive unit (1, 2), the first and the second drive unit (1, 2) are guided, initially while maintaining the torque required by the driver at the output (4), along torque guide curves in a controlled manner toward the respective target torque until one of the drive units (1, 2) reaches its torque limit, and subsequently the torque at that drive unit that has reached its torque limit is kept constant and the torque of the other drive unit that has not reached its torque limit is guided along a more flattened torque guide curve to a target torque, while providing an output torque that deviates from the torque required by the driver, at which the shift element (9) to be opened is positioned in a load-free manner.

4. The method according to claim 3, wherein when the other drive unit also reaches its torque limit, target torques are calculated for both drive units (1, 2), and the drive units are guided in a controlled manner along the torque guide curves to such target torques, at which the shift element (9) to be opened, while providing an output torque that deviates from the torque required by the driver, is positioned in a load-free manner.

5. The method according to claim 1, wherein when, during the guidance of the drive units (1, 2) toward their target torques, the torque required by the driver changes, the target torques for the drive units (1, 2) are recalculated such that the output torque provided at the output (4) corresponds as closely as possible to the torque required by the driver.

6. The method according to claim 1, wherein the first transmission shaft (6), on which the first drive unit (1) acts, is a transmission input shaft of the transmission (3), that the second transmission shaft (7), on which the second drive unit (2) acts, is a transmission shaft of the transmission (3) provided by a planetary stage (5) of the transmission (3), and that a transmission output shaft (8) of the transmission (3) acts on the output (4).

7. The method according to claim 6, wherein the first drive unit (1) is an internal combustion engine, and that the second drive unit (2) is an electric motor.

8. A control unit for operating a drive train, wherein the drive train comprises a first drive unit (1), a second drive unit (2), a transmission (3), and an output (4), whereas the first drive unit (1) acts on a first transmission shaft (6) of the transmission (3) and the second drive unit (2) acts on a second transmission shaft (7) of the transmission (3), the transmission further comprising several shift elements (9) whereby an output torque that depends on the torque required by the driver is provided at the output (4), the control unit configured for opening of one of the shift elements (9) in a load-free manner in accordance with the method of claim 1.

* * * * *